United States Patent [19]
Sanpei et al.

[11] Patent Number: 5,732,349
[45] Date of Patent: Mar. 24, 1998

[54] SYSTEM AND METHOD FOR CONTROLLING A PORTABLE TELEPHONE ACCORDING TO DISCRIMINATED AREA CODE

[75] Inventors: Masaru Sanpei, Kanagawa; Shigeru Imura, Tokyo, both of Japan

[73] Assignee: Sony Corporation, Tokyo, Japan

[21] Appl. No.: 495,010

[22] Filed: Jun. 27, 1995

[30] Foreign Application Priority Data

Jun. 28, 1994 [JP] Japan .................................. 6-146727

[51] Int. Cl.$^6$ .................................................. H04Q 7/00
[52] U.S. Cl. ........................ 455/435; 455/550; 455/422
[58] Field of Search ........................ 379/58, 59, 356, 379/357, 63; 455/33.1, 403, 404, 422, 432–438, 440, 565, 550, 551, 552, 558, 524, 217, 514, 509, 414

[56] References Cited

U.S. PATENT DOCUMENTS

| | | | |
|---|---|---|---|
| 5,142,654 | 8/1992 | Sonberg et al. | 455/422 |
| 5,361,396 | 11/1994 | Onoe et al. | 379/58 |
| 5,388,147 | 2/1995 | Grimes | 379/58 |
| 5,418,837 | 5/1995 | Johansson et al. | 379/58 |
| 5,437,053 | 7/1995 | Sawa et al. | 379/59 |
| 5,440,614 | 8/1995 | Sonberg et al. | 455/432 |
| 5,454,027 | 9/1995 | Kennedy et al. | 379/59 |
| 5,475,734 | 12/1995 | McDonald et al. | 379/63 |
| 5,479,476 | 12/1995 | Finke-Anlauff | 455/403 |
| 5,509,052 | 4/1996 | Chia et al. | 379/58 |
| 5,548,818 | 8/1996 | Sawyer et al. | 455/33.1 |
| 5,594,779 | 1/1997 | Goodman | 455/422 |
| 5,594,947 | 1/1997 | Grube et al. | 455/524 |

*Primary Examiner*—Dwayne Bost
*Assistant Examiner*—Tracy M. Legree
*Attorney, Agent, or Firm*—Lise A. Rode, Esq.; Jerry A. Miller

[57] ABSTRACT

A portable telephone for communicating with a base station connected to a telephone network has a communication control unit for controlling communication through the base station, a memory for storing control information for each area in which the telephone can be operated, together with a code of each area, and wherein the communication control unit includes a discriminator for discriminating the area code included in a control signal which is transmitted from the base station. The control information for the area of the area code which the discriminator has discriminated is read from the memory so that the communication control unit can make the corresponding communication control in accordance with the control information.

3 Claims, 3 Drawing Sheets

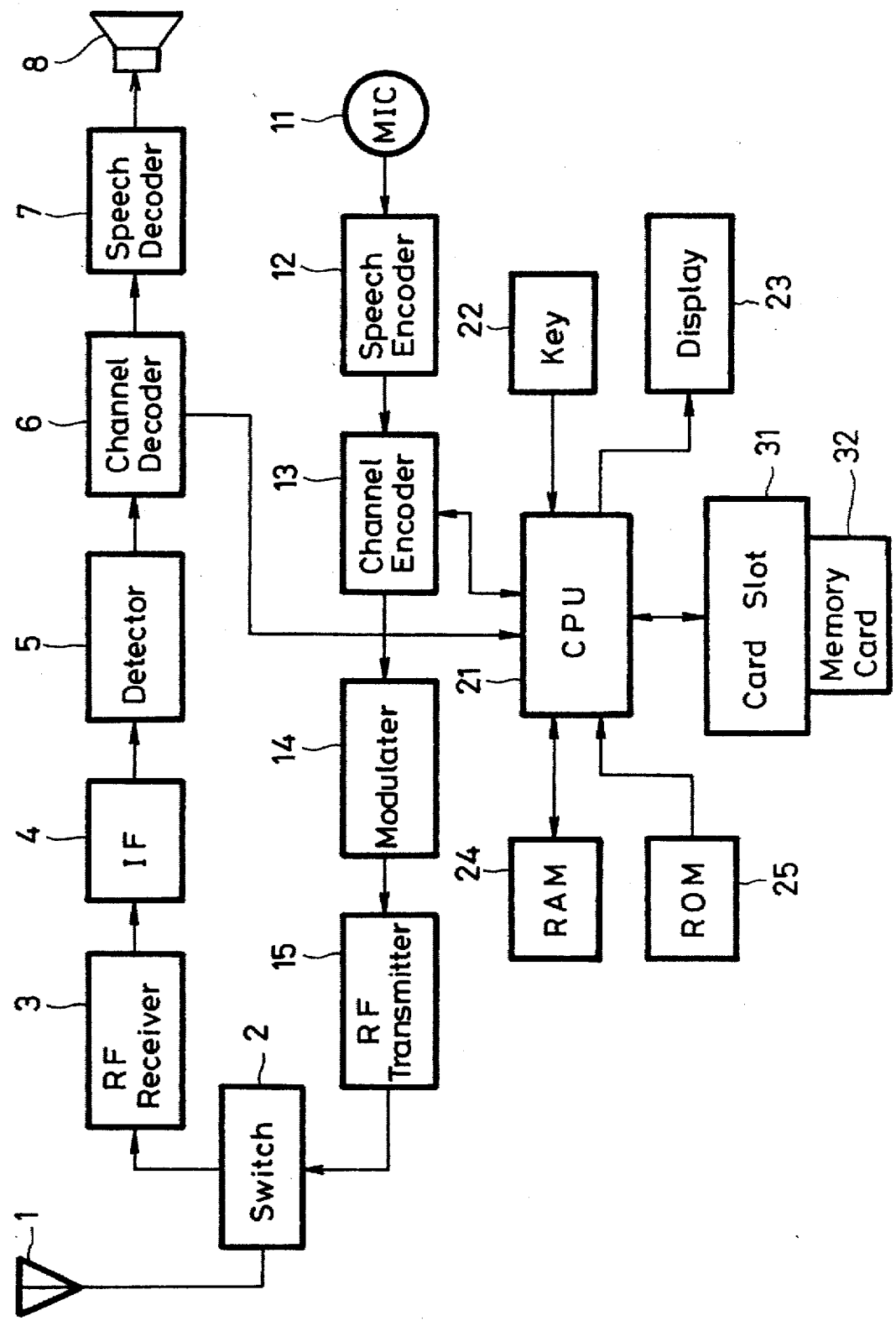

5,732,349

SYSTEM AND METHOD FOR CONTROLLING A PORTABLE TELEPHONE ACCORDING TO DISCRIMINATED AREA CODE

FIELD OF THE INVENTION

This invention relates to various types of portable telephone which communicate with a base station via radio waves.

BACKGROUND OF THE INVENTION

Various different types of portable telephones for radio communications have been developed so far. Portable telephone for radio communications are fundamentally used in communication systems which have base stations, as shown in FIG. 1 of the accompanying drawings.

As shown in FIG. 1, base stations B1, B2 and B3, are connected to a telephone network. When the user of any one of the portable telephones P1, P2, ... P5 makes a call, the calling telephone transmits a channel connection request signal to the corresponding base station via radio signals. If there is a free channel, the base station transmits a connection permission signal to this portable telephone via a control channel. Additionally, channel data of a voice channel which has been permitted to connect according to the connection permission signal, is transmitted through the control channel.

A voice channel for radio communications is now open between the base station and the portable telephone. Under this condition, when this portable telephone transmits the telephone number data of the party being called, the base station causes the portable telephone to be connected through a telephone exchange to the called person; as a result, a telephone conversation may be had between the connected user and the called person.

Since communications between portable telephones are thus made through base stations, communication between base stations B1, B2, B3 and portable telephone P1, P2, ... is limited to service areas A1, A2 and A3, respectively. The range of the service areas A1, A2, A3, depends on the system; for example, the smallest radio telephone system (or so-called telepoint system) is about 100 meters in radius around the base station. Comparatively, the service area of the system that is applied to mobile telephones is about several kilometers to ten and several kilometers in radius.

An international-type radio telephone system using these portable telephones has been developed for use in European countries in which a communication system is common to a number of countries. As a result, the same portable telephone can be operated in different countries. More specifically, the (GSM) pan-European digital cellular radio system ("GSM system") has been developed for use in the European countries and which allows for a portable telephone to be operated in any of the applicable European countries.

In the aforementioned GSM system, identification of the calling area within the area covered by the GSM network can be ascertained from control information transmitted over a broadcast control channel (BCCH) of the network. This control information includes a location area identification (LAI) information element which in turn includes, among other information, a mobile country code (MMC) from which it can be determined certain information regarding the communication system specifications of a particular country.

Since the GSM system construction is common to a number of countries, the user, when moving across any of this number of countries, can use a single portable telephone to talk with the called person who lives in any of these countries as long as the user and the called person are within their service areas. Therefore, such portable telephones are found to be very useful.

However, certain countries impose restrictions and limitations on some telephone functions and operations, so that these functions and operations cannot be freely provided in all countries. For example, with regard to message recording, there are countries which permit free recording, countries which permit recording only after warning the called person that his voice is going to be recorded, and countries which completely prohibit the user from recording the voice of the called person. Therefore, in the above discussed conventional portable telephone system, in countries which prohibit the recording of a called person's voice, only the calling party's voice may be recorded. As a result, the usefulness of such a telephone is reduced or limited in value for the calling party; particularly if he is calling from a country which permits the recording of the called party's voice.

Additionally, even though this system is standardized so that the same portable telephone can be used in each country, the frequency bands used in the countries are sometimes slightly different from each other. Accordingly, the portable telephones used in this system are constructed to cover the frequency bands of all countries, or to be able to search all the possible frequency bands for a channel through which they can communicate with their base station at the time of starting the operation. However, searching all the possible frequency bands at the time of starting the operation will result in searching unnecessary frequency bands depending on the country in which the portable telephone is operated. Thus, a lot of time is required in order to access the base station.

Moreover, different telephone services are available in various countries, and the telephone numbers for those services in a country are often not the same as other countries. For example, the emergency telephone numbers for contacting police or fire stations, or telephone numbers for weather forecast and directory assistance may be different in each country. Therefore, when the user moves across a number of countries and dials such a service number, he must first determine the number used with the service in each country before he can dial same. Of course, such a process is cumbersome.

In view of the foregoing, it is an object of the present invention to provide a portable telephone capable of being operated in each of a number of areas or countries so that the user can easily operate the telephone in any of these areas or countries.

SUMMARY OF THE INVENTION

Therefore, according to this invention, there is provided a portable telephone for use in radio communications with a base station which is connected to a telephone network. This portable telephone includes a communication control means for completing communication control through the base station, a memory means for storing codes of respective areas or countries and for storing control information including LAI information for each area or country in which this telephone can be used, and a discriminating means for discriminating an area code from the LAI information included in a control signal which the base station transmits, whereby the LAI information in the control signal is read out from the memory means and used so that the communication control means can complete the corresponding communication control in accordance with the control information.

Additionally, in accordance with another aspect of this invention, the frequency band for use in communication with the base station is selected according to the control information.

In accordance with still another aspect of the present invention, the telephone number for a particular service is discriminated or identified by the control information and the corresponding number is dialed.

In accordance with yet another aspect of the present invention, there is provided another memory means for storing a speech signal transmitted from or to the base station. The memory means is controlled to wholly (or partly) store or not to store the speech signal according to the control information.

According to the present invention, since the portable telephone side detects an area code from the LAI information which is added to a control signal in each area and causes the communication control means to make the corresponding communication control, the most suitable communication control can be made in each area, thus overcoming the difficulties that the functions permitted in an area are different from those in another area.

Furthermore, according to this invention, since the frequency band used for communication with the base station is determined by the detection of the corresponding area code, the frequency band for each area can be automatically selected and thus the access to the base station in each area can be readily achieved.

In addition, since the telephone number for a particular service can be discriminated from the others via the detection of the associated area code and then dialed, the user can easily dial a desired telephone number for a particular service in any area.

Furthermore, since the speech signal is differently controlled to be wholly or partly stored or not to be stored in accordance with the detected area code, the speech recording function can be automatically set in each area.

BRIEF DESCRIPTION OF THE DRAWINGS

FIG. 3 is a block diagram of a portable telephone according to an embodiment of the present invention; and, FIG. 4 is a flowchart to which reference will be made in explaining the controlled state of the portable telephone according to the embodiment of the present invention.

DETAILED DESCRIPTION OF THE PREFERRED EMBODIMENT

Figure 1:
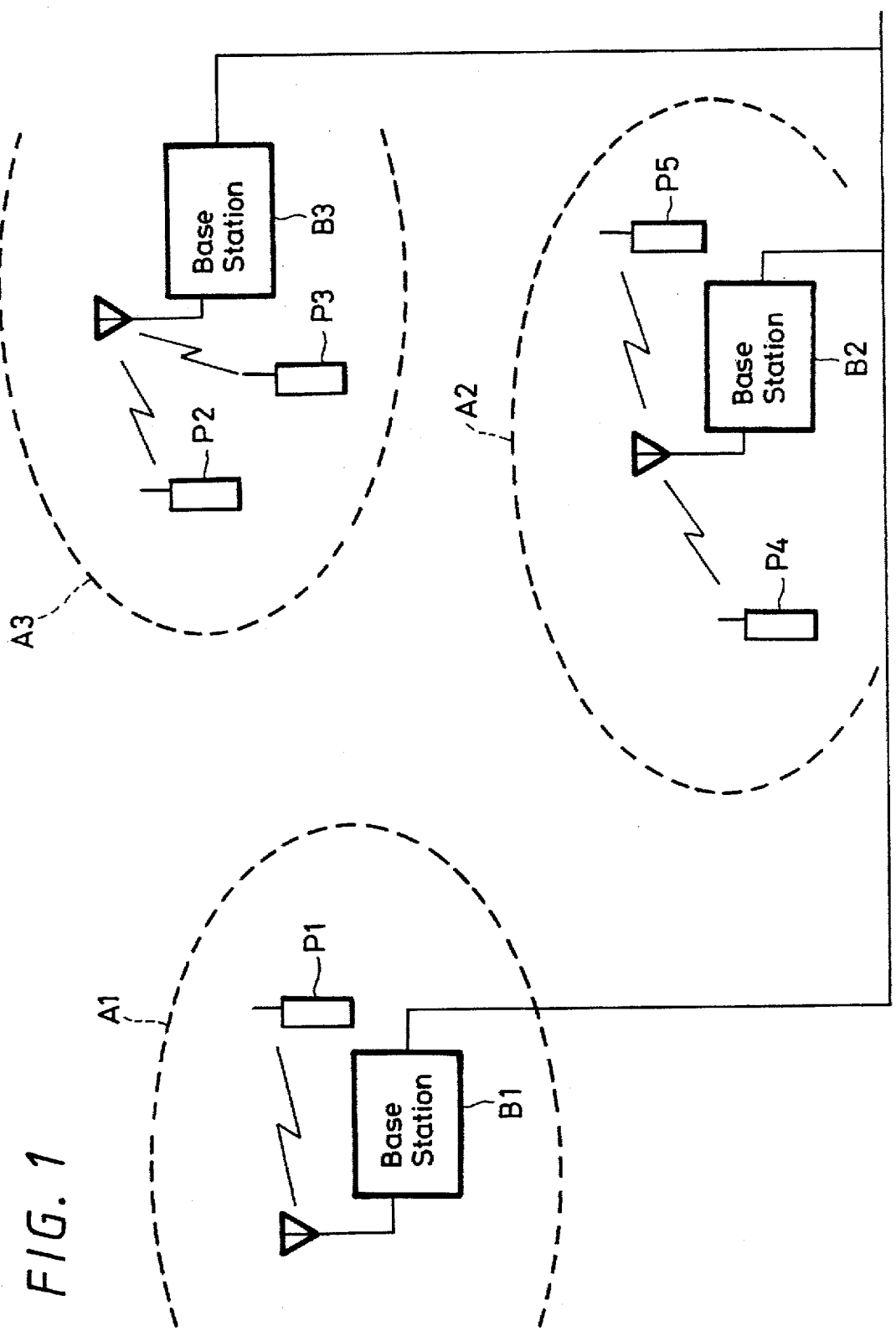
FIG. 1 is a schematic diagram showing an arrangement of an example of a portable telephone system.
Figure 2:
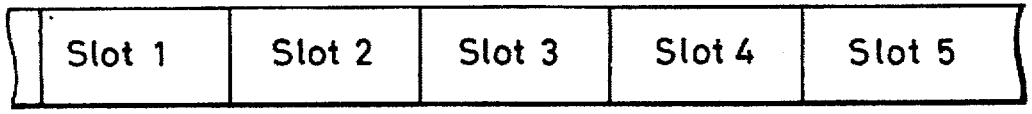
FIG. 2 is a schematic diagram used to explain an example of a communication slot format.

A portable telephone according to an embodiment of the present invention will be described below with reference to FIGS. 2 through 4.

This embodiment is an application of the invention to a portable wireless telephone which can transmit and receive digital data to and from a base station by radio such as under the above-described GSM system. Of course, it will be appreciated that this system can be used with other wireless communication devices which operate using radio signals.

First, the communication system will be described. In this embodiment, slot-format data, as shown in FIG. 2, is transmitted to, and received from, a base station. The communication system used in this case is a time-sharing multiplex system, or what might be called TDAMA (time division multiple access) system, in which a certain slot is used for the transmission of data from the base station, another predetermined slot is used for the transmission from a portable telephone to the base station, and the other slots which are not used for communication between this portable telephone and the base station are for communication between other portable telephones and the base station. In addition, control data including LAI information is transmitted via a certain slot from the base station to each terminal device. In this embodiment, the control data to be transmitted includes the mobile country code (MMC) of a country in which this base station is located.

FIG. 3 shows in block form an example of the arrangement of the portable wireless telephone as a terminal device.

Referring to FIG. 3, there is provided an antenna 1. A signal received at the antenna 1 is supplied through a change-over switch 2 to an RF receiver circuit 3, where a signal of a certain frequency band (channel) is extracted from the input signal and then converted into an intermediate-frequency signal. This converted channel is determined under the control of a central processing unit (CPU) 21 for controlling the communication operation of this telephone.

The intermediate-frequency signal from the RF receiver circuit 3 is fed to and processed, or amplified by an intermediate-frequency circuit 4. The intermediate-frequency signal from the intermediate-frequency circuit 4 is supplied to a detector 5, where the modulated signal is demodulated into a base-band signal. The base-band signal from the detector 5 is fed to a channel decoder 6 where only a signal within a predetermined slot is extracted from the transmitted time-sharing multiplex signal. Then, data of a speech signal included in the extracted signal of the channel decoder 6, is supplied to and converted into an analog speech signal by a speech decoder 7. This analog signal is fed to a speaker 8, so that the speech emanates from the speaker. In addition, control data included in the extracted signal from the channel decoder 6, (including location area identification (LAI)) is fed to and discriminated by the CPU 21.

Moreover, as shown in FIG. 3, there is provided a microphone 11. A voice picked up by this microphone 11 is fed as an analog speech signal to a speech encoder 12, where it is encoded into digital speech data of the format according to this telephone system. This digital speech signal is fed to a channel encoder 13 where it is processed to be located within a certain slot. The control data from the CPU 21 is also fed to the channel encoder 13 and thereby processed to be located within another certain slot together with the speech data. The slot-format data being transmitted, and which the channel encoder 13 produces, is supplied to and modulated by a modulator 14. The modulated data being transmitted is fed to an RF transmitter circuit 15 where it is processed to produce a transmission signal having a predetermined frequency band (channel). This transmission signal is supplied through the change-over switch 2 to the antenna 1, from which it is then transmitted by radio.

The CPU 21 is also connected to operation keys 22 which include dial keys, function keys and so on, and to a display 23 having a liquid crystal display panel on which the talking state and dialed number are displayed. When necessary keys of the operation keys 22 are pressed, the CPU 21 makes a call, and the dialed number is displayed on the display 23.

In addition, the telephone according to this embodiment preferably includes a random-access memory (RAM) 24 connected to the CPU 21 as memory means for storing speech during telephone conversation. When one or more of the keys 22, for recording the voice, are depressed in order to cause the RAM 24 to store the voice, the received voice data extracted by the channel decoder 6, and the voice data being transmitted which is fed to the channel encoder 13, are supplied through the CPU 21 to and stored in the RAM 24. When another certain one of the keys 22, for reproducing the voice is depressed in order to reproduce the recorded voice, the voice data stored in the RAM 24 is read by the CPU 21 and supplied to the channel decoder 6. It is then fed through the speech decoder 7 to the speaker 8.

However, when the CPU 21 detects that the country or countries in which this communication is now occurring has a restriction or limitation on the recording of speech (according to a discrimination of the country codes which will be described later on) the associated storing process is performed. Also, the RAM 24 according to this embodiment has a storage capacity capable of storing several minutes of voice, for example.

The CPU 21 is also connected to a read-only memory (ROM) 25 in which are stored programs for controlling the telephone. The CPU 21 reads out the corresponding control program from the ROM 25 and controls the communication according to this program. The control programs stored in the ROM 25 can be used by the CPU 21 to control the telephone in various controlled operating states in all countries in which this telephone can be operated. In other words, the ROM 25 stores the codes of all countries in which this telephone can be operated, as well as the country-dependent data of the different detailed operating states for those particular functions in which the telephone is controlled.

Examples of functions which place the telephone in different states according to country include: the difference among the limitations to the recording of speech (again, there are countries in which no limit is provided to the recording of speech, countries in which the recording of speech is permitted only after warning the called person, or countries in which the recording of the speech of the called person is completely prohibited); the difference among the frequency bands on which the telephone can communicate with the base station in these different countries; and the difference among the telephone numbers which the user can dial for particular services in these different countries (including the number for emergency to a police station and so on, and the numbers for weather forecast or time signal).

The CPU 21 according to this embodiment includes a discriminator (not shown) for discriminating the mobile country code (MMC) included in the received LAI information of the control data supplied thereto from the channel decoder 6. The CPU 21 also causes the control program associated with the MMC detected by this discriminator to be read out from the ROM 25, and brings about the communication state associated with this MMC. The received and discriminated MMC is stored in a memory (not shown) within the CPU 21 until another MMC is detected from the received data.

The telephone according to this embodiment may also include a memory card holding slot 31 in which a memory card 32 has already been inserted. Information on the memory card 32 is read by the CPU 21. In this case, the information read out from the memory card 32 includes private information such as the identification number of the user of this telephone.

Operation of this portable telephone will be described with reference to a flowchart of FIG. 4.

Figure 4:
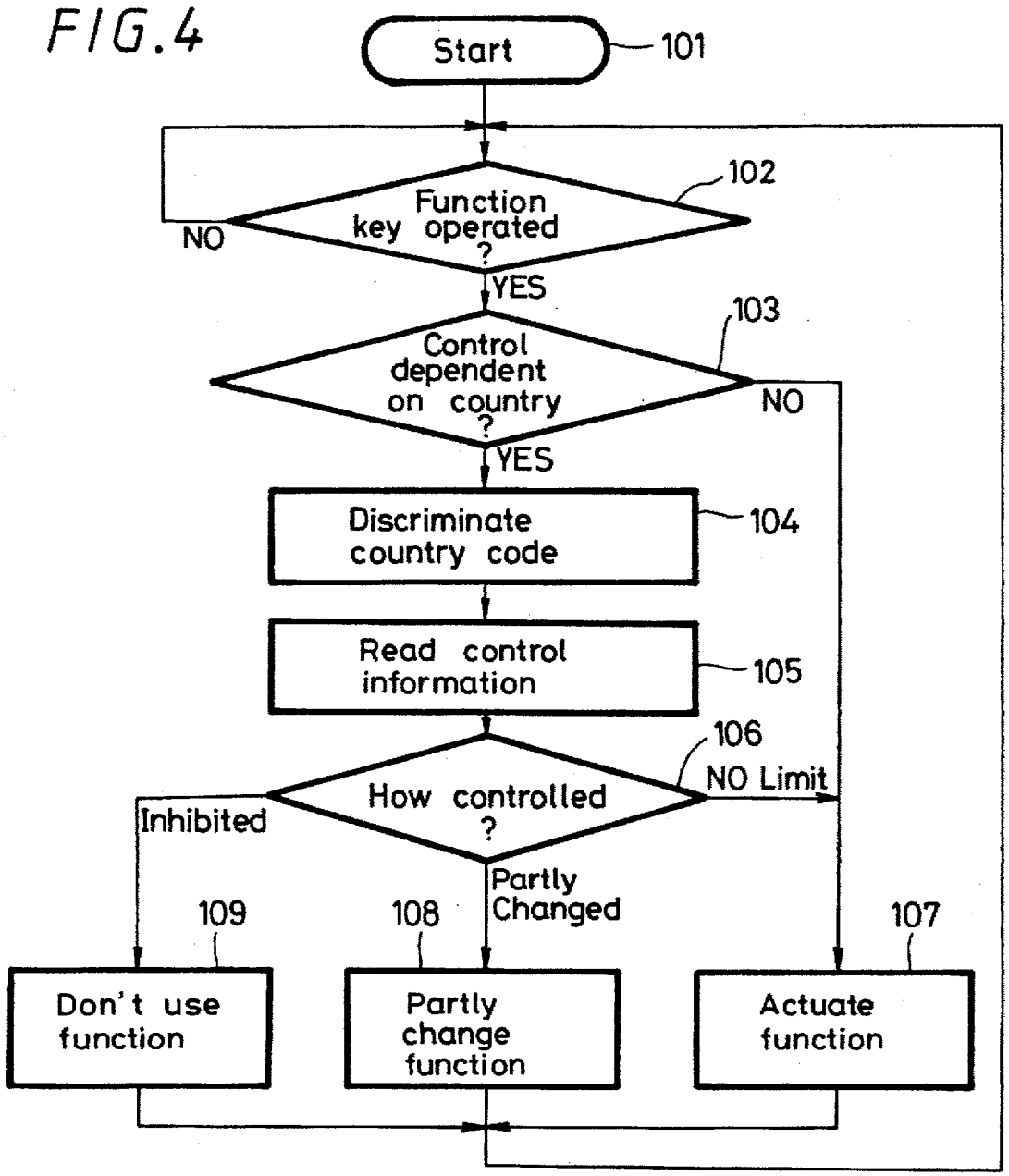

As shown in FIG. 4, a telephone of the present invention starts to operate (step 101), and when a certain function key of the keys 22 is pressed (step 102), the CPU 21 detects a function corresponding to the pressed key and checks if this function brings about a controlled operating state which is country-dependent (step 103). If the controlled operating state is country-dependent, the CPU 21 discriminates, or identifies, the mobile country code (MMC) included in the control data now transmitted from the base station to this telephone (step 104). Then, the data of this controlled operating state associated with this mobile country code is read out from the ROM 25 (step 105).

At step 103, if it is determined that the controlled operating state is not country-dependent, the program proceeds to step 107, at which the indicated function is normally executed. For example, when a function key is pressed in order to confirm the amount of remaining electricity in the battery, the remaining amount is directly indicated on the display 23 under the control of the CPU 21 since this function is not limited to any one country.

If, however, a function which is country-dependent is selected, it is decided whether the controlled operating state indicated by the mobile country code (MMC) read at step 105 requires complete prohibition of the use of the function, partial limitation of the use of the function, or no limitation on the function whatsoever (step 106).

If it is determined that there is no limitation on the function, the program goes to step 107 at which the indicated function is normally executed. For example, when the function key for voice recording is pressed, and when the country code included in the received control data indicates the country has no limit to the recording of speech, the speech is normally recorded (i.e., the speech data is stored in the RAM 24).

If it is determined at step 106 that the function is partially regulated, the program proceeds to step 108, where the indicated function is partly changed according to the regulation, and then executed. For example, when the function key for voice recording is pressed, and when the mobile country code (MMC) included in the received control data indicates the country in which voice recording is possible only after warning the called person that his voice is to be recorded, an alarm sound (e.g., alarm by speech synthesis) is transmitted to the called person, and then the speech is recorded.

If at step 106 the function is determined to be completely prohibited, it is not used (step 109). For example, when the function key for voice is pressed and the mobile country code included in the LAI information of the received control data indicates a country in which voice recording is completely prohibited, only the speech picked up by the microphone 11 of this telephone is recorded (i.e., only the voice data of the calling party is stored in the RAM 24). Alternatively, neither voice may be recorded.

Therefore, since the function for voice recording is controlled by the mobile country code as described with reference to this flowchart, the portable telephone of the present invention can be used in a number of countries including countries in which the function for voice recording is limited or restricted. Hence, the portable telephone becomes more useful.

Additionally, in accordance with the present invention, when a function key is pressed, the resulting controlled operating states may be indicated by letters and/or figures on the display 23 under the control of the CPU 21. In addition, the names of the countries detected from the mobile country codes may be displayed on the display 23. Furthermore, the information displayed on display 23 may be changed according to the MMC so to correspond to the language of the corresponding country; e.g., when an operator moves from France to Germany, the display data is changed from French to German language.

While the function key for voice recording is controlled by the code of country as described above, other function keys may also be controlled by the mobile country code. For example, an emergency call function key may be provided on this telephone in order that the user can call a police station or an ambulance. In this case, the emergency telephone numbers for various different countries are also discriminated by use of the mobile country code so that the user can dial the corresponding number. Thus, the user can easily and accurately make an emergency call in any country by simply pressing a function key. Another function key for a particular service (directory, weather forecast, time signal or the like) by which the corresponding telephone number can be dialed, may be provided and controlled by use of the country code so that the number associated with a country in which the telephone exists can be dialed.

Furthermore, when the frequency band for communication with the base station depends on the country in which this telephone is located, it may also be determined by the mobile country code. Thus, unused frequency bands can be prevented from being used by mistake.

Additionally, the MMC can be used to control the correction of time as an operator changes time zones. This may be accomplished by reading out time difference data from memory (e.g., ROM 25). This time data preferably comprises for each relevant country the time difference between that country's time and Greenwich Mean time. Thus, when an operator moves between countries, the control information including the MMC controls the CPU 21 to read out from memory, for each of the two countries, the difference in time between Greenwich Mean time and current time. Through a simple algorithm, the time of the country in which the operator is determined and then displayed on display 23. Of course, other functions which may be controlled by the MMC as will be appreciated by those skilled in the art, and the present invention is not limited to those functions set forth herein.

While the aforementioned codes are assigned to countries in the above embodiment, those codes may instead be used for areas or regions other than countries such as states, or calling or service areas.

Also, it will be understood by those skilled in the art that while the communication system used for communication between the portable telephone and the base station has not been described in detail in the above embodiment, the portable telephone of the present invention may be used with any wireless telephone system which employs various different communication systems.

According to the present invention, since the portable telephone side discriminates or identifies an area code included in the control code which is then added to the control signal at each area, and causes communication control means of the telephone control communication according to the area code, the most suitable communication control can be performed in each area. Thus, when the function for a service includes different limitations in each area, such difficulties can be automatically overcome by the above-mentioned features.

In this case, since the frequency band for use in communication with the base station may be determined by detecting the area code, the frequency band to be used in each area can be automatically selected and thus the access to the base station in each area can be made readily.

Moreover, since according to the present invention the correct telephone number for a particular service in an area is decided by the detection of the area code and subsequently dialed, the user can easily make a call for that particular service in any area.

Furthermore, since voice recording during a telephone conversation is differently controlled by detecting the area code, the voice signal can be automatically recorded, partially recorded, or prevented from being recorded in association with each area.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A portable telephone apparatus for communicating with a base station connected to a communication network, said apparatus comprising:

a memory for storing control signals for a plurality of areas in which said portable telephone apparatus can be operated, each of said control signals including frequency band information associated with said plurality of areas and determining how said portable telephone apparatus should respond to a user's instruction in each of said areas;

a receiver for receiving an area signal transmitted from said base station, said signal indicating an area in which said base station is located;

a reading unit for reading from said memory one of said control signals in accordance with said area signal, and the frequency band information corresponding to said area signal; and a controller for controlling said portable telephone apparatus in accordance with said one of said control signals wherein in response to said user's instruction said controller tunes said telephone apparatus to said frequency band information read out from said memory of said reading unit.

2. The portable telephone apparatus of claim 1, further comprising a function key for automatically dialing a service telephone number, said control signals further including a plurality of service telephone numbers for the same kind of service, each of said plurality of service telephone number being associated with each of said areas, said reading unit reading out of said memory the service telephone number corresponding to said area signal, said controller dialing said service telephone number when said function key is pushed.

3. The portable telephone apparatus of claim 1, further comprising a function key for automatically dialing an emergency telephone number, said control signals further including a plurality of emergency telephone numbers for the same kind of emergency service, each of said emergency telephone numbers being associated with each of said areas, said reading unit reading out of said memory the emergency telephone number corresponding to said area signal, said controller dialing said emergency telephone number when said function key is pushed.

\* \* \* \* \*